Jan. 20, 1931.   C. A. ROGERS   1,789,343
TRUCK
Filed Aug. 1, 1928
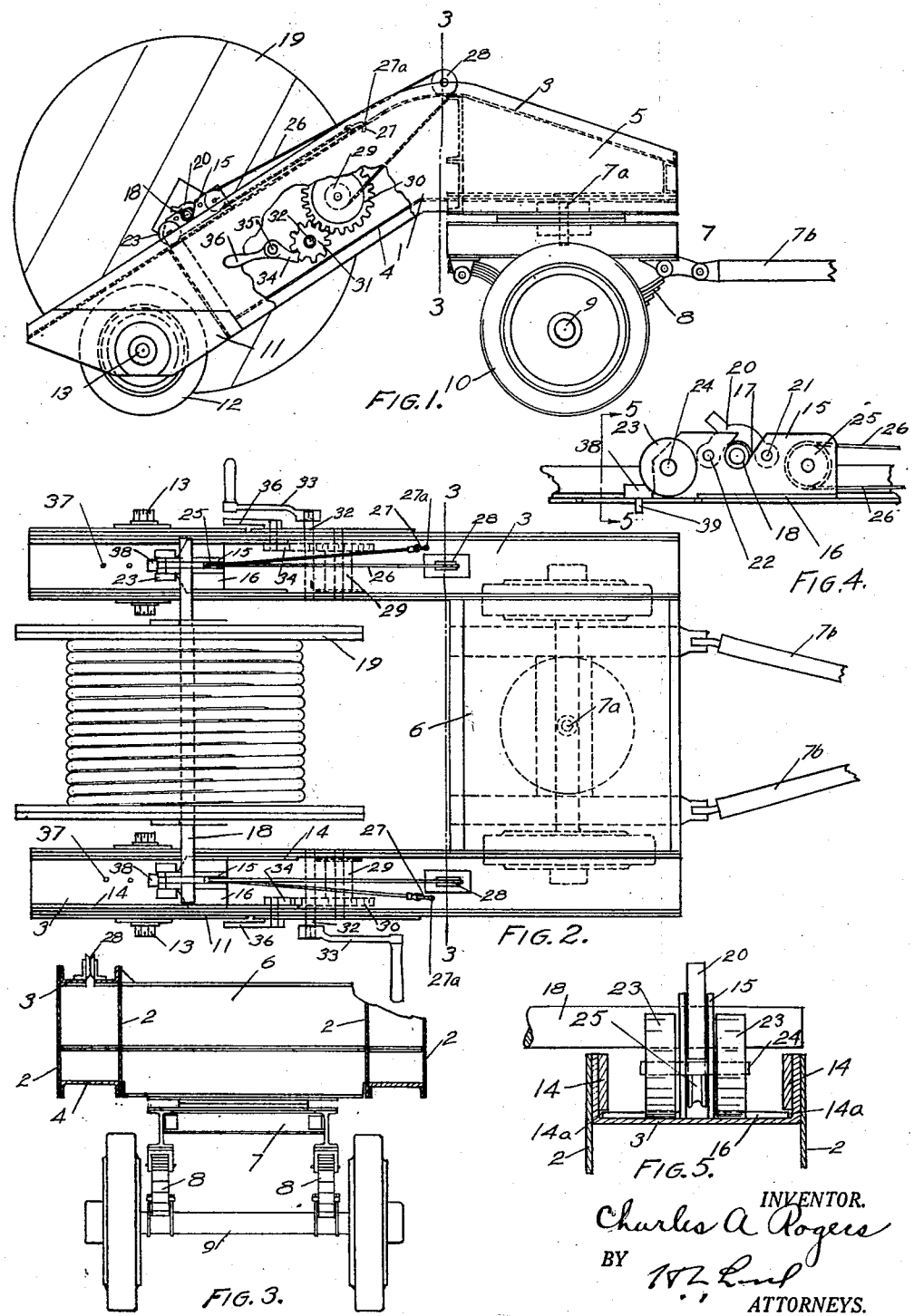

Patented Jan. 20, 1931

1,789,343

UNITED STATES PATENT OFFICE

CHARLES A. ROGERS, OF ALBION, PENNSYLVANIA, ASSIGNOR TO ROGERS BROTHERS CORPORATION, OF ALBION, PENNSYLVANIA, A CORPORATION OF PENNSYLVANIA

TRUCK

Application filed August 1, 1928. Serial No. 296,707.

The invention is of particular advantage in handling cable spools and as exemplified is shown as so adapted and arranged. Features and details of the invention will appear from the specification and claims.

A preferred embodiment of the invention is illustrated in the accompanying drawings as follows:—

Fig. 1 shows a side elevation of the truck.
Fig. 2 a plan view.
Fig. 3 a section on the lines 3—3 in Figs. 1 and 2.
Fig. 4 a side elevation of one of the load-carrying blocks.
Fig. 5 a section on the line 5—5 in Fig. 4.

1 marks the body. The body is forked, each side of the fork being of box-construction having the sides 2, top plate 3, and bottom plate 4. These sides are inclined and have a horizontal projecting front end 5, the front end being connected by a box-shaped structure 6. A bolster frame 7 is arranged under the connecting portion 6 by a king bolt 7a. Springs 8 extend from the bolster frame 7 to an axle 9 and wheels 10 are arranged on the axle. A tongue 7b extends forwardly from the bolster frame by means of which the truck may be drawn. The side plates of the sides are re-enforced at 11 and wheels 12 are arranged between the side plates of each fork, said wheels being supported on axles 13 secured in said side plates and re-enforcing plates 11. The bottom plate does not extend entirely to the bottom permitting the wheel to extend into the box cavity of the side frame.

Load-carrying blocks are arranged on the inclined upper surfaces of the forked sides of the frame. The side plates 2 extend upwardly from the top plate 3 of the side frames forming in effect a trough-shaped structure along the side walls of which are guide plates 14 forming guide grooves 14a. Each load-carrying block is formed of angle plates having upright portions 15 and bottom extending portions 16, the portions 16 extending into the grooves 14a so as to lock the block on the top of the forked sides. The plates 15 have the load-carrying notches 17 adapted to receive the spool shaft 18. A cable spool 19 is mounted on the shaft 18. In practice the spool is rolled between the forks and the blocks moved down the incline sufficiently to permit the entrance of the shaft 18 into the slot 17 after which the blocks are moved up the incline sufficiently to lift the spool off the ground. The shaft is locked in the slots 17 by a latch 20 pivoted on a pin 21 extending between the uprights 15, the opposite end of the latch being locked by a pin 22 which extends through the latch and the plates 15. This locks the shaft in the notch so that it may be secured against accidental removal due to the jolting of the truck. Rollers 23 are mounted on a pin 24 at the lower end of the block and are adapted to carry the major portion of the load on the block so as to reduce the friction in moving the block along the channel formed in the top of the forked sides.

A sheave 25 is arranged between the plates 15 at the upper end of the block. A cable 26 is provided with a hook 27 which is adapted to hook into an opening 27a in the top plate. The cable is carried over a sheave 28 at the top of the frame and carried into the box structure and on to a reel 29 journaled between the side plates 2. The reel is provided with a gear 30 which meshes with a gear 31. The gear 31 is fixed on a shaft 32 which is also journaled in the sides 2—2, the shaft 32 having a squared end adapted to receive a crank 33 by means of which the cables may be wound up so as to move the blocks up the inclines and thus lift the spool off the ground and into loaded position. In order to lock the spools in their elevated position a dog 34 is provided operating on the gear 31 and this is adapted to lock the gear against return movement. This dog is on a shaft 35 provided with a handle 36 at the side of the frame so that the dog may be thrown in and out of engagement. In addition to this the top plate 3 is provided with a series of openings 37 and a locking block 38 has a pin 39 adapted to be dropped into the openings 37 back of the block. As the load is eased off on to the blocks 38 the pins 39 are locked in position by the lip of the block extending into the space between the sides 15.

What I claim as new is:—

1. In a truck, the combination of a body of fork shape, the sides of the fork being inclined; a wheel support at the front end of the fork; wheel supports at the rear end of the fork sides; load carrying blocks on the inclined fork sides; means moving the blocks up the inclined fork sides to lift a load; and devices locking the lifted load between the wheel supports at the front and rear of the body.

2. In a truck, the combination of a body of fork shape, the fork sides being inclined; load carrying blocks on said inclined sides; a swivelled axle at the front of the fork carried by the connection between the fork sides; wheels on the axle; wheels at the rear of the fork sides, means moving the blocks up the inclined support to lift the body; and means locking the load so lifted between the wheel supports on the axle and the wheel supports at the rear of the fork sides.

3. In a truck, the combination of a hollow fork-shaped body, the fork sides being inclined; load carrying blocks on the inclined fork sides, said blocks having load-receiving slots; and means for moving the blocks up the inclined sides to lift a load comprising a reel mechanism within the hollow body and cable connections between the reel mechanism and the blocks.

4. In a truck, the combination of a body of fork form, the fork sides being inclined and having trough-shaped upper surfaces formed by channels with plates forming guide grooves at the sides; load carrying blocks formed of angles, the lower projections of the angles extending into the guide grooves, the uprights of said blocks having load-receiving slots; and means for moving the blocks up the inclined sides to lift a load.

5. In a truck, the combination of a body of fork form, the fork sides being inclined and having trough-shaped upper surfaces with guide grooves at the sides; load carrying blocks formed of angles, the lower projections of the angles extending into the guide grooves, the uprights of said blocks having load-receiving slots and extending beyond the ends of the lower projections; axles extending through the extending ends of the uprights, rollers on the axles, said rollers operating on the bottoms of the trough-shaped surface of the fork sides and means for moving the blocks up the inclined sides to lift a load.

6. In a truck, the combination of a body of fork form, the fork sides being inclined and having trough-shaped upper surfaces with guides grooves at the sides; load carrying blocks formed of angles, the lower projections of the angles extending into the guide grooves, the uprights of said blocks having load-receiving slots; devices on the blocks for locking a shaft in said slots for locking the blocks in position on the incline; means for moving the blocks up the inclined sides to lift a load comprising sheaves between the uprights of the angles; and cables operating on said sheaves for moving the blocks up the inclines.

In testimony whereof I have hereunto set my hand.

CHARLES A. ROGERS.